Figure 1:
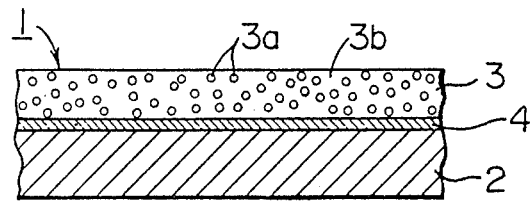

United States Patent [19]

Miyakawa et al.

[11] 4,333,967
[45] Jun. 8, 1982

[54] PROCESS OF MAKING A THERMOSENSITIVE RECORDING MATERIAL

[75] Inventors: Nobuhiro Miyakawa, Kobe; Tatsuo Aizawa, Osaka, both of Japan

[73] Assignee: Mita Industrial Company, Tokyo, Japan

[21] Appl. No.: 224,626

[22] Filed: Jan. 12, 1981

Related U.S. Application Data

[60] Division of Ser. No. 136,068, Mar. 28, 1980, which is a continuation of Ser. No. 971,833, Dec. 19, 1978, abandoned.

[30] Foreign Application Priority Data

Dec. 21, 1977 [JP] Japan .................................. 52-154855

[51] Int. Cl.³ ............................................. B41M 3/12
[52] U.S. Cl. .................................... 427/148; 427/123; 427/388.4; 427/388.5
[58] Field of Search ...................... 427/148, 57, 388.4, 427/388.5, 123

[56] References Cited

U.S. PATENT DOCUMENTS 3,924,049 12/1975 Truitt et al. .................... 427/148 X Primary Examiner—Bernard D. Pianalto
Attorney, Agent, or Firm—Wenderoth, Lind & Ponack

[57] ABSTRACT

A process of making a thermosensitive recording material comprising a matrix of an electrically insulating, film-forming thermoplastic resin and dispersed as a fine powder in the matrix, a linear aliphatic dicarboxylic acid having at least 13 carbon atoms or its ammonium salt, and a thermosensitive recording material provided by applying aforesaid material to the conductive surface of a thermally stable substrate.

11 Claims, 5 Drawing Figures

PROCESS OF MAKING A THERMOSENSITIVE RECORDING MATERIAL

This application is a division of application Ser. No. 136,068, filed Mar. 28, 1980, which application is in turn a continuation of application Ser. No. 971,833, filed Dec. 19, 1978, now abandoned).

This invention relates to a novel thermosensitive recording material. More specifically, it relates to a thermosensitive recording material comprising as a main thermosensitive ingredient a linear aliphatic dicarboxylic acid having at least 13 carbon atoms or its ammonium salt, to a process for its production, and to its use as an electrostatic recording material.

The thermosensitive recording material is that type of recording medium which is adapted to form an image on a thermosensitive recording layer by utilizing an irreversible chemical or physical change induced in the recording layer by application of heat energy. Conventional thermosensitive recording techniques utilizing a chemical change typically include a method in which a thermosensitive recording layer containing a combination of a leuco dye and a phenolic compound, a combination of a metal salt of a long-chain fatty acid and an organic sulfur compound, or a combination of an organic acid, a pH indicator and an organic alkaline agent is heated to induce a color reaction in such a combination so as to form a colored image at the heated part; and a method in which a thermosensitive recording layer made of a heat-polymerizable monomer is heated to polymerize the monomer, and a toner or the like is applied to the recording layer to adhere only to the heated part by utilizing the increased tackiness of the recording layer as a result of polymerization and thus to form a colored image. On the other hand, a typical method for thermosensitive recording based on a physical change comprises covering a layer colored by a dye, pigment, carbon, etc. with a wax to form an opacified recording layer, and heating the recording layer to render it transparent and thus to reveal the lower colored layer.

It has now been unexpectedly found in accordance with this invention that when a recording layer comprising a linear aliphatic dicarboxylic acid having at least 13 carbon atoms or its ammonium salt dispersed as a fine powder in a matrix of a thermoplastic resin is heated, the electrostatic characteristics of the surface of the recording layer, especially its surface potential acceptance, change irreversibly, and thus, quite a new type of thermosensitive recording material is provided which quite differs from the aforesaid conventional thermosensitive recording materials in the mechanism of image formation.

According to this invention, there is provided a thermosensitive recording material comprising a matrix of an electrically insulating, film-forming thermoplastic resin and dispersed as a fine powder in the matrix, a linear aliphatic dicarboxylic acid having at least 13 carbon atoms or its ammonium salt.

The invention will be described in greater detail below.

The aliphatic dicarboxylic acid used in the recording material of this invention contains at least 13, preferably 14 to 26, more preferably 16 to 22, carbon atoms. It may have short side-chains, but is substantially a linear aliphatic dicarboxylic acid. The aliphatic dicarboxylic acid may be saturated or unsaturated, but is preferably saturated. When an unsaturated aliphatic dicarboxylic acid is used, it preferably has the lowest possible degree of unsaturation with the number of double bonds per molecule being 2 or less.

Suitable aliphatic dicarboxylic acids have a melting point of not more than 150° C., preferably not more than 130° C.

The ammonium salt of the aliphatic dicarboxylic acid can also be used in this invention. The ammonium salts include those resulting from conversion of one or both of the two carboxyl groups into an ammonium salt.

Typical examples of the linear aliphatic dicarboxylic acid and its ammonium salts are listed below (the parenthesized figures show melting points).

1,11-Undecanedicarboxylic acid, $HOOC(CH_2)_{11}COOH$ (114° C.), 1,12-dodecanedicarboxylic acid, $HOOC(CH_2)_{12}COOH$ (124° C.), 1,13-tridecanedicarboxylic acid, $HOOC(CH_2)_{13}COOH$ (114° C.), 1,14-tetradecanedicarboxylic acid $HOOC(CH_2)_{14}COOH$ (123° C.), 1,15-pentadecanedicarboxylic acid, $HOOC(CH_2)_{15}COOH$ (118° C.), 1,16-hexadecanedicarboxylic acid, $HOOC(CH_2)_{16}COOH$ (125° C.), 1,18-octadecanedicarboxylic acid, $HOOC(CH_2)_{18}COOH$ (122° C.), 1,20-eicosanedicarboxylic acid, $HOOC(CH_2)_{20}COOH$ (124° C.), 1,22-docosanedicarboxylic acid, $HOOC(CH_2)_{22}COOH$ (127° C.), 7-tetradecene-1,14-dicarboxylic acid, $HOOC(CH_2)_6-CH=CH(CH_2)_6COOH$ (109° C.), 7-11-octadecadiene-1,18-dicarboxylic acid, $HOOC(CH_2)_6CH=CH(CH_2)CH=CH(CH_2)_6COOH$ (114° C.), and the ammonium salts of these dicarboxylic acids.

These aliphatic dicarboxylic acids or the ammonium salts thereof may be used singly or as a mixture of two or more.

Thermoplastic resins which can be used as a matrix in which to disperse the linear aliphatic dicarboxylic acid or its ammonium salt are those which have electrical insulation (desirably having a volume resistivity of at least $10^{13}$ ohms-cm, preferably at least $10^{14}$ ohms-cm), and are film-forming. Generally, suitable thermoplastic resins have a glass transition temperature (Tg) of not more than 70° C., preferably not more than 60° C., more preferably not more than 50° C., a softening temperature of generally about 75° to about 170° C., preferably about 80° to about 160° C., more preferably about 90° to about 150° C., and a number average molecular weight ($\overline{M}n$) of at least 50,000, preferably about 45,000 to about 2,000, more preferably about 35,000 to about 3,000.

Specific examples of thermoplastic resins that can be used advantageously in this invention include acrylic resins, saturated polyester resins, vinyl resins (e.g., polyvinyl butyral resin, vinyl chloride/vinyl acetate copolymer, vinyl chloride/vinyl acetate/vinyl alcohol copolymer, vinyl chloride/vinyl acetate/maleic acid copolymer), vinyl aromatic monomer/butadiene copolymers (e.g., styrene/butadiene copolymer, vinyltoluene/butadiene copolymer), olefinic resins, cyclized rubbers, and coumarone resins. Those having compatibility with the linear aliphatic dicarboxylic acid or its ammonium salt during melting are especially suitable.

Most preferred are the acrylic resins. Examples of the acrylic resins include homopolymers of acrylic monomers such as acrylic acid, methacrylic acid, methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate or lauryl methacrylate; copolymers of at least two of these acrylic monomers with each other, and copolymers of at least one of said acrylic monomer, which may account for at least 10 mole%, preferably at least 15 mole%, based on the copolymer, of another copolymerizable comonomer such as itaconic acid, fumaric acid, maleic acid, maleic anhydride, crotonic acid, aconitic acid, styrene, α-methylstyrene, β-chlorostyrene, vinyltoluene, vinyl acetate, acrylonitrile, 2-hydroxyethyl methacrylate, hydroxypropyl methacrylate, 2-hydroxyethyl acrylate, hydroxypropyl acrylate, acrylamide, N-methylol acrylamide, diacetone acrylamide, or glycidyl methacrylate. Those which can be especially advantageously used in this invention are poly(methyl acrylate), poly(methyl methacrylate), methyl methacrylate/butyl acrylate copolymer and styrene/methyl methacrylate copolymer.

In the recording material of this invention, a fine powder of the linear aliphatic dicarboxylic acid or its ammonium salt is uniformly distributed throughout the matrix of the thermoplastic resin, and a part of it is believed to be deposited on the surface of the resin matrix. An observation of the recording material by an electron microscope (X 1000) shows that is surface presents an irregular appearance which looks like densely stretched roots of a tree. Thus, the term "dispersed as a fine powder", as referred to herein, does not mean that the dicarboxylic acid or its ammonium salt is dispersed in the resin matrix as molecular units or untrafine units close thereto, but means that the dicarboxylic acid or its salt forms micelles of a certain size and is dispersed in the resin matrix as colloidal or larger solid particles. Microscopically, the dicarboxylic acid or its ammonium salt is evenly distributed heterogeneously in the resin matrix. In the dispersed state, the dicarboxylic acid or its salt has an average particle diameter of generally not more than 8 microns, preferably 5 to 0.1 microns, more preferably 3 to 0.3 microns. Thus, the thermosensitive recording material of this invention generally assumes a cloudy or semitransparent appearance.

The amount of the dicarboxylic acid or its salt to be dispersed in the matrix resin is not strictly restricted, and can be changed widely according to the types of the dicarboxylic acid and the matrix resin, etc. Generally, it can be used in an amount of 5 to 40 parts by weight, preferably 10 to 30 parts by weight, more preferably 15 to 25 parts by weight, per 100 parts by weight of the thermoplastic resin.

In the present invention, a certain phenolic compound can be incorporated into the resin matrix as an aid for improving the electrostatic characteristics of the surface of the recording layer when the recording material of the invention is usec for electrostatic recording. Examples of the phenolic compound are α- or β-resorcylamide, resorcinol-4-carboxylic acid, catechol-4-carboxylic acid, 2,3-cresotic acid, 2,6-dihydroxybenzoic acid, gallic acid, 4-bromo-α-resorcylic acid, and bisphenol-S. These phenolic compounds can be used either alone or as a mixture of two or more. The amount of the phenolic compound is generally at most 20 parts by weight, preferably 1 to 15 parts by weight, more preferably 5 to 10 parts by weight, per 100 parts by weight of the thermoplastic resin.

When the recording material of this invention is formed on a film or sheet and used for thermal recording, it tends to adhere to an original or a thermal head at the time of heating. To avoid it, a tackiness preventing agent may be incorporated into the recording material of the invention. Examples of the tackiness preventing agent are titanium dioxide, zinc oxide, varous clays, white carbon, magnesium oxide, aluminum oxide, calcium carbonate, magnesium carbonate, calcium sulfate, barium sulfate, aluminum hydroxide, silica, satin white, lithopone, and starch particles. The amount of the tackiness preventing agent is that which does not adversely affect the charging characteristics of the resulting recording material. It is generally not more than 50 parts by weight, preferably about 5 to about 30 parts by weight.

If desired, other additives such as antioxidants, stripping agents, and coloring agents may be incorporated.

According to this invention, the thermosensitive recording material having the above construction can be produced by a process which comprises intimately mixing a solution or dispersion of an electrically insulating, film-forming thermoplastic resin with at least one linear aliphatic dicarboxylic acid having at least 13 carbon atoms or its ammonium salt, and drying the resulting mixture at a temperature of not more than 40° C.

According to one embodiment of the above method process, the dicarboxylic acid or its salt can be uniformly dispersed as a fine powder in the resin solution or dispersion by vigorously stirring the solution or dispersion of the thermoplastic resin and the dicarboxylic acid or its salt methanically, for example by a wet pulverizing method using such a pulverizer as a ball mill, tube mill, vibratory mill or colloid mill, or by applying ultrasonic irradiation or by using a high-speed shear stirrer.

In this embodiment, the resin may be used in the form of a solution or a dispersion (e.g., an aqueous emulsion) in a solvent capable of dissolving the resin substantially. When it is to be used as an aqueous emulsion, it is desirably a soapless-type emulsion not containing a surface active agent. The dicarboxylic acid or its salt may be used as a solution or dispersion in a solvent or dispersing medium used in the preparation of the resin solution or dispersion. This is not essential, and the dicarboxylic acid may be insoluble in such a solvent or dispersing medium.

According to another embodiment of the process of the invention, the dicarboxylic acid or its salt is mixed in the form of a solution with the resin solution or dispersion. In this case, the solvent used to dissolve the dicarboxylic acid or its salt may be identical with, or different from, the solvent or dispersing medium used to dissolve or disperse the matrix resin. When the solvents are different, it is desirable that they have compatibility with each other, and the solvent for the discarboxylic acid or its salt have a lower boiling point than the solvent or dispersing medium for the matrix resin.

The mixing operation may be performed at room temperature, or at an elevated temperature of up to about 60° C.

Examples of the solvent or dispersing medium used to dissolve or disperse the resin include water, hydrocarbons such as benzene, toluene, xylene and kerosene, alcohols such as ethanol, butanol, propanol, and diacetone alcohol, ketones such as acetone, methyl ethyl ketone and cyclohexanone, and cyclic ethers such as tetrahydrofuran, dioxolane, and methyldioxolane.

Examples of the solvent that can be used to dissolve the dicarboxylic acid or its salt include water, alcohols such as ethanol, butanol, propanol and diacetone alcohol, ketones such as acetone, methyl ethyl ketone and cyclohexanone, cyclic ethers such as tetrahydrofuran, dioxolane, and methyl dioxolane, dimethyl formamide, and dimethyl sulfoxide.

The liquid composition prepared in the above manner is then cast or coated on a suitable substrate, and then dried. It is important that the drying should be performed at a temperature lower than the melting point of the dicarboxylic acid or its salt, preferably at a temperature of not more than 40° C., more preferably at a temperature of not more than 35° C. As a result, a thermosensitive recording material can be prepared which is in the form of a self-supporting film or sheet, or a combination of a support such as paper, fabrics, non-woven fabrics, plastic sheets or films, glass sheets, metal folds, metal-deposited papers, or metal laminated papers and a recording layer of the above formulation coated or laminated on the support.

As a result, there is provided a thermosensitive recording material comprising a matrix of an electrically insulating, film-forming thermoplastic resin, and a linear aliphatic dicarboxylic acid or its ammonium salt dispersed as a fine powder in the resin matrix.

When heat is applied imagewise to the thermosensitive recording sheet of the invention, the electrostatic characteristics of the heated portion change, and the surface potential acceptance of the heated portion increases markedly from that of the non-heated portion. As a result, the surface of the recording layer permits easy acceptance of a surface charge, and holds the applied charge over long periods of time. It is not entirely clear why such a characteristic is obtained. Plausible reasons are that at least a part of the fine particulate dicarboxylic acid or its salt in the heated portion which is dispersed in the resin matrix is melted to form an apparently uniform molten mixture with the resin matrix, and thus to cause phase change; or that since the thermosensitive recording material is of the structure in which the dicarboxylic acid having hydrophilic carboxyl groups or its salt is dispersed in the thermoplastic resin, its surface is hydrophilic and electrically semiconductive, and when heat is applied to the surface, the orientation of the molecules of the dicarboxylic acid or its salt changes to cause a change in the electrical characteristics of the surface.

The substantial heating temperature required for performing the thermosensitive recording on the recording material of this invention is generally at least 100° C., and preferably 110° to 170° C. A heat pen, heat stamp, thermal head, heater, infrared lamp, xenon flash lamp, or laser can, for example, be cited as a source of heat energy for this heating operation.

By utilizing the aforesaid thermosensitive recording characteristics, the thermosensitive recording material of this invention can be used as a recording layer for electrostatic recording materials. Thus, according to this invention, there is provided an electrostatic recording material comprising a substrate at least one surface of which is electrically conductive and thermally stable, for example supports used in ordinary electrostatic recording materials such as metal foils, metal-deposited papers, metal laminated papers, and metal laminated plastic films or sheets, and applied in a customary manner such as coating or laminating, a thermosensitive recording layer composed of the thermosensitive recording material of the invention.

The thickness of the thermosensitive recording layer is not critical, but generally it is 3 to 50 microns, preferably 5 to 40 microns, more preferably 8 to 30 microns.

One example of a method for performing electrostatic recording or electrostatic printing by using the thermosensitive electrostatic recording material is described by reference to the accompanying drawings.

BRIEF AND DETAILED DESCRIPTION OF THE DRAWINGS

Figure 2A:
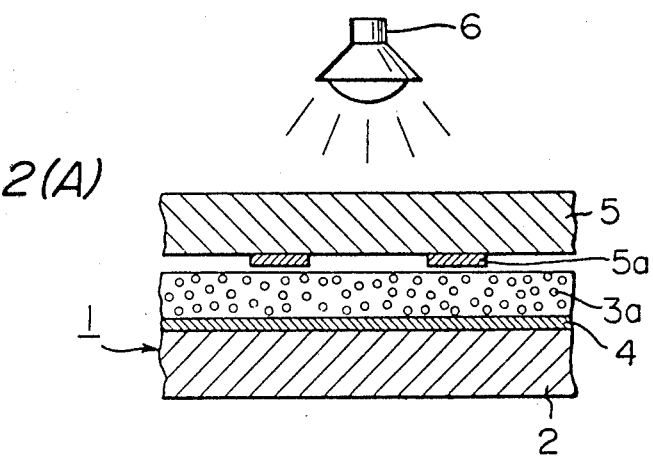
Figure 2B:
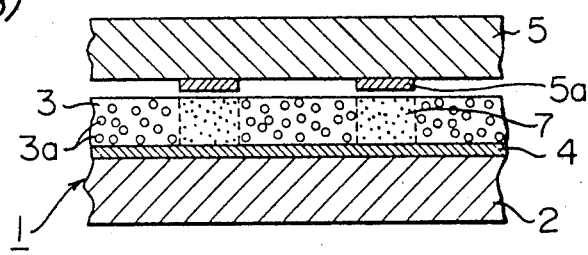

FIG. 1 is a schematic sectional view of an image-forming thermosensitive electrostatic recording sheet 1 produced by using the electrostatic recording material of this invention. This material is composed of a support 2, such as a transparent plastic film, having a conductive layer 4 on one surface and a thermosensitive recording layer 3 made of the thermosensitive recording material of this invention applied to the conductive layer 4. The layer 3 consists of a thermoplastic resin matrix 3b and fine particles 3a of the dicarboxylic acid or its salt. In forming an image on the sheet 1, the thermosensitive recording layer 3 of the sheet 1 is brought into contact with a transparent original 5 [FIGS. 2(A) and 2(B)] bearing a heat-absorbing image area 5a, and heat is radiated onto the original 5 from an infrared lamp 6. With a rise in temperature by the absorption of heat by the image area 5a, at least a part of the dicarboxylic acid or its salt in that part of the thermosensitive recording layer which corresponds to the area 5a is melted, and usually has increased transparency. Thus, a latent image pattern 7 [FIG. 2(B)] having increased surface potential acceptance is formed.

Figure 3:
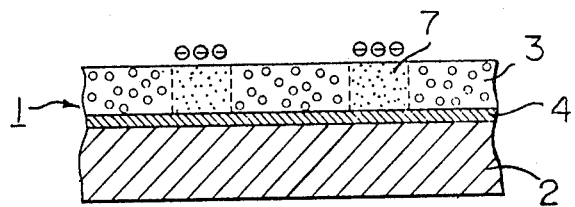
Figure 4:
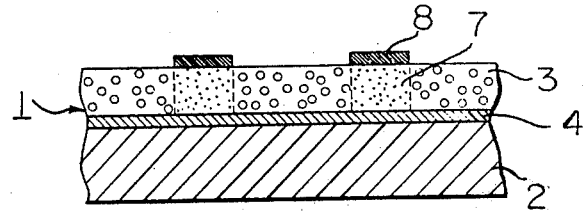

The sheet 1 having the latent image pattern 7 so formed is then subjected to corona discharge by using an ordinary electrostatic copying machine, a static charge is held only at the surface portion of the latent image pattern 7 (FIG. 3). When this pattern is developed with a toner in accordance with an ordinary electrostatic developing method, the toner 8 adheres to the surface of the latent image pattern 7 (FIG. 4). The adhering toner can be fixed by applying heat or pressure, or may be transferred to a receptor sheet as in PPC-type electrostatography. In the case of the latter, the latent image pattern 7 on the sheet 1 does not disappear even by a cleaning operation after electrostatic transfer, and therefore, the sheet can be used as a master for electrostatic printing of a number of copies.

The following examples further illustrate the present invention. All parts in these examples are by weight.

EXAMPLE 1

A mixture of 10 parts of 7,11-octadecadiene-1,18-dicarboxylic acid (melting point 113° C.), 50 parts of toluene, 3.5 parts of finely divided silica (Syloid P-244, a trademark for a product of Fuji Davison Chemical Co., Ltd.) and 110 parts of a 30% toluene solution of an acrylic acid (LR-297, a trademark for a product of Mitsubishi Rayon Co., Ltd.; Tg 30° C.; softening point 120° C.) was milled for 10 hours in a ball mill. The ball-milled mixture was coated by a wire bar coater to a thickness of 10 microns on a 80-micron thick art paper which had been rendered electrically conductive (surface resistance: 20° C., 60% RH, $3.2 \times 10^7$ ohms), and dried with air at 40° C. to form a thermosensitive sheet. Letters were printed on the thermosensitive sheet by a thermal head controlled so as to provide a maximum temperature of 230° C. (the sheet was sensitive to heat at 170° C.), and was charged and developed by using a dry copying machine (COPYSTER-900D, a trademark for a product of Mita Industrial Company, Limited). As a result, the toner adhered firmly to the printed parts alone.

Similar results were obtained when the above procedure was repeated except that the dicarboxylic acid was replaced by the corresponding ammonium salt.

EXAMPLE 2

Two parts of 1,18-octadecanedicarboxylic acid (melting point 122° C.) was dissolved at 40° C. in 5 parts of diacetone alcohol and 15 parts of toluene. To the solution was added 50 parts of a 20% by weight toluene solution of a styrene/methacrylate copolymer (a product of Goodyear Company, Tg 39° C., softening point 130° C.) to form a uniform solution. The solution was coated on a 50-micron thick tracing paper, and dried at 40° C. for 30 minutes. The coating had a thickness of about 14 microns. The coated surface of the resulting thermosensitive-sheet was superimposed on Test Chart No. 1-R (specified by Japan Association of Electrophotography), and the assembly was processed by a commercially available copying machine (THERMOFAX, a product of Sumitomo 3M Co., Ltd.). That part of the thermosensitive sheet which corresponded to the image area of the test chart became transparent. Then, the sheet was negatively charged by corona discharge at $-6$ KV, and developed with a positively charged magnetic brush of a two-component toner. A receptor sheet was superimposed on the developed sheet, and the assembly was passed through transfer rollers to which a voltage of $-350$ V had been applied. After transfer, the transferred image was fixed by a hot fixing roller to form an electrostatically printed sheet having an image faithful to the original test chart and being free from fog. The reflective density of the image was 1.0. The resulting thermosensitive sheet could be used as a master for electrostatic printing, and 500 copies could be obtained from it through a series of charging, development, transfer and cleaning.

EXAMPLE 3

Two parts of 1,14-tetradecanedicarboxylic acid (melting point 123° C.) and 1.5 parts of α-resorcylamide were dissolved in 25 parts of tetrahydrofuran at an elevated temperature. To the solution was added 50 parts of a 20% by weight toluene solution of an acrylic resin (LR-297, trademark), and the mixture was fully stirred and heated to form a uniform solution. The solution was then coated by a wire bar coater on a support which had been rendered electrically conductive (one-surface art paper having a surface resistance of $3 \times 10^8$ ohms and a thickness of 80 microns), and dried for a day and night at 30° C. After the drying, the coating had a thickness of 12 microns. Letters were printed on the coated surface using a thermal head which had been controlled so as to attain a maximum temperature of about 230° C. (the thermosensitive sheet was sensitive to heat at 120° C.). The sheet was then negatively charged by applying corona discharge at $-6$ KV, and developed with a positively charged magnetic brush. A receptor sheet was then superimposed on the developed sheet and transfer was performed by negative corona discharge. Letters corresponding to the printed parts were seen on the receptor sheet, and were transformed into a permanent image by heat fixation. Using this master sheet, 5000 copies could be obtained by electrostatic printing through a series of cleaning, charging, developing and transferring operations.

EXAMPLE 4

A mixture of 5 parts of 1,12-dodecanedicarboxylic acid (melting point 124° C.), 3 parts of resorcinol-4-carboxylic acid, and 34 parts of a 50% by weight toluene solution of an acrylic resin (ACRYDIC A-405, a trademark for a product of Dainippon Ink and Chemicals Inc.) was milled together with 15 parts of methyl ethyl ketone in a ball mill for 10 hours. The dispersion was coated on a 60-micron thick tracing paper, and dried at 40° C. for 20 minutes. The coating had a thickness of 7 microns. Letters were printed on the resulting sheet by a type front heated at 130° C. The sheet was negatively charged, and a bias voltage of $-50$ V was applied. In the same way as in Example 2, 2000 copies were produced by electrostatic printing. The printed copies were free from fogging, and no change was observed in print density. The printed copies had a reflective density of 1.3.

EXAMPLE 5

A mixture of 12 parts of 7-tetradecene-1,14-dicarboxylic acid (melting point 109° C.), 4 parts of 2,6-dihydroxybenzoic acid, 25 parts of finely divided silica (Syloid P-244, a trademark), 60 parts of an acrylic resin (AROTAP 3211, a trademark for a product of Nisshoku Arrow K. K.; Tg=14° C.; 50% solution), 100 parts of a 10% toluene solution of a saturated polyester resin (VYLON 300, a trademark for a product of Toyo Spinning Co., Ltd.; Tg 6° C.; softening point 123° C.), and 100 parts of methyl ethyl ketone was ball-milled for 10 hours. The resulting dispersion was coated to a thickness of about 10 microns on a 80-micron thick Mylar film, and dried at 40° C. for 20 minutes. The coated surface of the thermosensitive sheet was superimposed on an original bearing letters, and the sheet was exposed irradiating light from the side of the thermosensitive sheet using a xenon flash lamp with an output of 2800 Ws. It was then negatively charged by applying corona discharge, and developed by a positively charged magnetic brush. A receptor sheet was superimposed on the sheet, and transfer was performed by using transfer rolls to which a voltage of $-450$ V had been applied. The transfer image was fixed by passing the receptor sheet through hot fixing rollers to form a printed sheet havng a permanent image. It was free from fogging, and the fine configurations of the letter-bearing original were faithfully reproduced in the printed sheet.

EXAMPLE 6

A mixture of 10 parts of 7,11-octadecadiene-1,18-dicarboxylic acid, 30 parts of titanium oxide, 50 parts of an acrylic resin (ARON S-1001, a trademark for a product of Toa Synthetic Chemical Industry, Co., Ltd.; Tg 30° C.; 50% solution), 50 parts of a 20% by weight tetrahydrofuran solution of vinyl chloride/vinyl acetate copolymer (softening point 76° C.; a product of Sekisui Kagaku Kogyo K. K.), and 70 parts of toluene was ball-milled for 10 hours. The resulting dispersion was coated on the same support as used in Example 1 so that the thickness of the coating after drying became about 15 microns. The resulting sheet was printed in the same way as in Example 2, and using this master sheet, 100 copies were obtained by electrostatic printing. The voltage of corona discharge was −6 KV, and a bias voltage was −120 V. The printed copies were free from fogging, and the print densities of the copies were 1.4.

EXAMPLE 7

Five parts of 1,16-hexadecanedicarboxylic acid was dissolved in 50 parts of tetrahydrofuran, and then 55 parts of a 30% by weight toluene solution of a 3:1 mixture of an acrylic resin (ACRYDIC 7-1027; a trademark) and cyclized rubber (THERMOLIOT N, a trademark for a product of Seiko Chemical Co., Ltc.) was added. The mixture was fully stirred to form a uniform solution. The solution was coated on the conductive surface of an 80-micron thick Myler film coated with an electrically conductive resin (ECR-34, a trademark for a product of Dow Chemical Co.), and dried to form a coating having a thickness of 9 microns. In accordance with the procedure of Example 1, letters were printed on the resulting sheet by a thermal head, and 1000 copies were produced by electrostatic printing. The density of the printed copies was 1.4 at a negative voltage, and 1.3 at a positive voltage. The fog was less than 0.1, but was removed when a bias voltage of 50 V was applied.

EXAMPLE 8

Five parts of 1,14-tetradecanedicarboxylic acid and 10 parts of 1,18-octadecanedicarboxylic acid were dissolved in 150 parts of tetrahydrofuran at an elevated temperature. To the solution was added 150 parts of a 50% by weight toluene solution of an acrylic resin (DIANAL LR-188, a trademark for a product of Mitsubishi Rayon Co., Ltd.; Tg=10° C.), and they were mixed to form a uniform solution. The resulting solution was coated on a 60-micron thick tracing paper, and dried to form a master having a thermosensitive layer with a thickness of 15 microns. A halftone-bearing original (Test Chart No. 1-R of Japan Association of Electrophotography) was superimposed on the thermosensitive layer of the master, and was duplicated by Thermofax. The surface of the master was negatively charged by applying corona discharge at −6 KV, and immediately developed by a magnetic brush of a monocomponent conductive powder developer (a product of Mita Industrial Company, Limited; for fixation by pressure). A receptor sheet having a surface resistance of $1.5 \times 10^{13}$ ohms was superimposed on the developed sheet, and a negative corona discharge was applied from the back surface of the receptor sheet. The toner image transferred to the receptor sheet was fixed to a permanent image by passing the receptor sheet between pressure rollers. By a similar operation, 1500 printed copies were produced by electrostatic printing. These copies were free from fogging, and had halftones faithful to the original. The image density was 1.3.

COMPARATIVE EXAMPLE

Stearic acid, sebacic acid, and 1,10-decanedicarboxylic acid were selected as a linear saturated aliphatic monocarboxylic acid of 18 carbon atoms, a linear saturated aliphatic dicarboxylic acid of 10 carbon atoms, and a linear saturated aliphatic dicarboxylic acid of 12 carbon atoms, respectively, and tested for suitability as a thermosensitive material for electrostatic printing masters.

To 10 parts of a 50% by weight toluene/butanol solution of an acrylic resin (DIANAL LR-297, trademark) was added 0.5 part of each of the carboxylic acids described above. The mixture was heated together with 10 parts of tetrahydrofuran to form a uniform solution. The solution was coated on an art paper which had been rendered electrically conductive, and dried at 40° C. for 30 minutes to form a coating having a dry thickness of 11 microns. An iron piece heated at 120° C. was brought into press contact with the surface of the sheet to give a heat pattern. The sheet was then negatively charged uniformly by applying a corona discharge at −5 KV, and immediately then, developed by a positively charged magnetic brush of a two-component toner. The toner image was fixed by heating. The reflective densities of the unheated portion and heated portion were measured. The results are shown in the following table. There was scarcely any difference in density between the unheated portion and the heated portion in any of the thermosensitive materials tested, and rather, the density decreased in the heated portion. Accordingly, these carboxylic acids could not be used as thermosensitive material for electrostatic printing masters.

| Thermosensitive material | Reflective density | |
|---|---|---|
| | Unheated portion | Heated portion |
| Stearic acid | 1.8 | 1.75 |
| Sebacic acid | 1.8 | 1.6 |
| 1,10-Decanedicarboxylic acid | 1.8 | 1.65 |

What we claim is:

1. A process for producing a thermosensitive recording material comprising a matrix of an electrically insulating, film-forming thermoplastic resin and, dispersed as a fine powder in the matrix, at least one linear aliphatic dicarboxylic acid having at least 13 carbon atoms and a melting point of not more than 150° C. or its ammonium salt, the amount of the linear aliphatic dicarboxylic acid or its ammonium salt being 5 to 40 parts by weight per 100 parts by weight of the resin matrix, which comprises intimately mixing a solution or dispersion of the electrically insulating, film-forming thermoplastic resin with 5 to 40 parts by weight per 100 parts by weight of the resin of the linear aliphatic dicarboxylic acid or its ammonium salt, and drying the resulting mixture at a temperature of not more than 40° C.

2. The process of claim 1 wherein the thermoplastic resin has a glass transition temperature of not more than 70° C.

3. The process of claim 1 wherein the thermoplastic resin has a softening temperature of about 75° to about 170° C.

4. The process of claim 1 wherein the thermoplastic resin is an acrylic resin.

5. The process of claim 1 which further mixing the solution or dispersion with a phenolic compound.

6. The process of claim 5 wherein the amount of the phenolic compound is at most 20 parts by weight per 100 parts by weight of the resin matrix.

7. The process of claim 1 wherein the linear aliphatic dicarboxylic acid contains from 13 to 26 carbon atoms.

8. The process of claim 1 wherein the linear aliphatic dicarboxylic acid or its salt is uniformly dispersed as a fine powder in the solution or dispersion of the thermoplastic resin by vigorously stirring the solution or dispersion and the dicarboxylic acid or its salt mechanically.

9. The process of claim 8 wherein the stirring is carried out by using a pulverizer or high-speed shear stirrer or by applying ultrasonic irradiation.

10. The process of claim 1 wherein the dicarboxylic acid or its salt is mixed in the form of a solution with the solution or dispersion of the thermoplastic resin.

11. The process of claim 1 wherein the mixing is performed at room temperature, or an elevated temperature of up to about 60° C.

* * * * *